May 6, 1930.    R. R. SEARLES ET AL    1,757,746
VEHICLE SPRING BEARING
Filed March 10, 1925
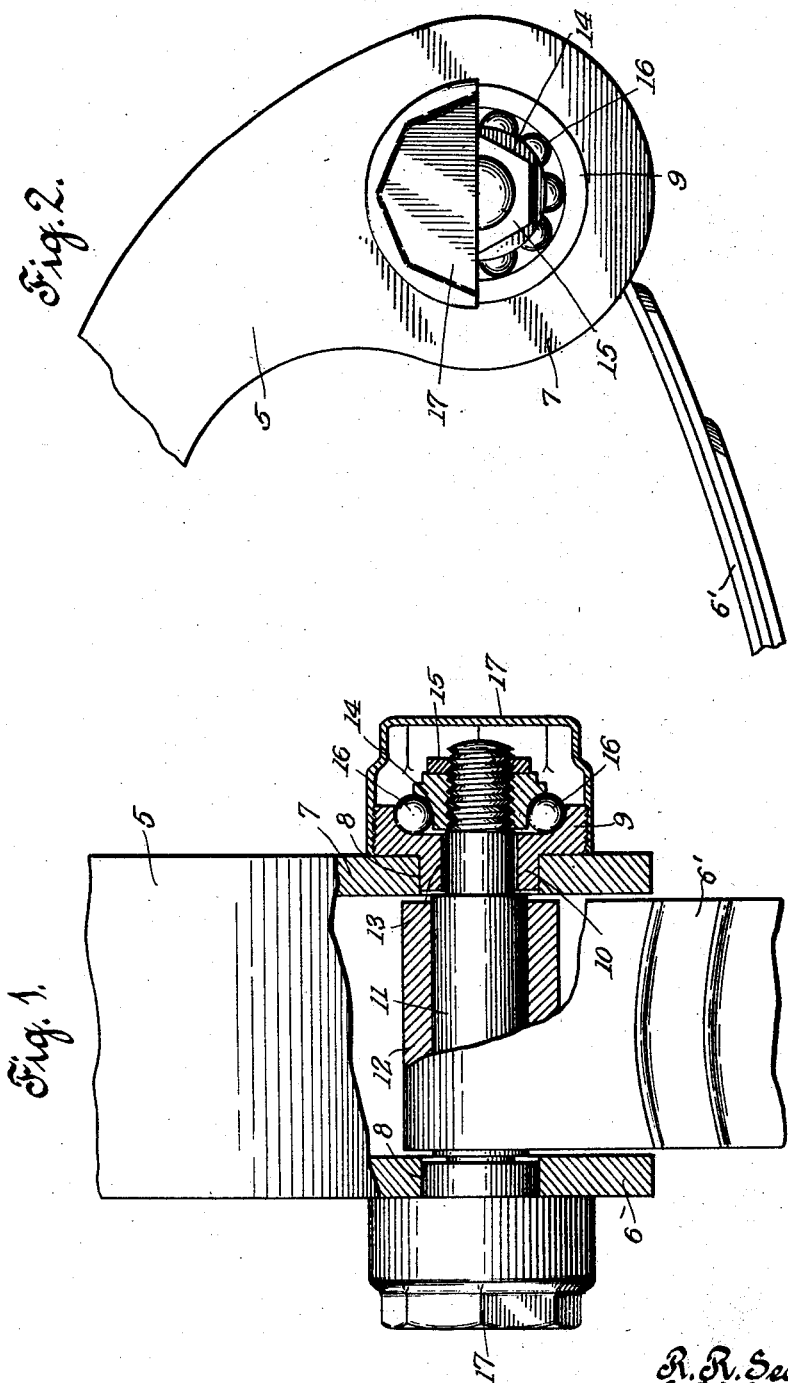

Patented May 6, 1930

1,757,746

UNITED STATES PATENT OFFICE

RAYMOND R. SEARLES AND ELISHA H. COOPER, OF NEW BRITAIN, CONNECTICUT, ASSIGNORS TO THE FAFNIR BEARING COMPANY, OF NEW BRITAIN, CONNECTICUT, A CORPORATION OF CONNECTICUT

VEHICLE-SPRING BEARING

Application filed March 10, 1925. Serial No. 14,395.

Our invention relates to a bearing for a vehicle spring and particularly to an anti-friction bearing for the hinge end of a spring.

It is an object of the invention to provide a serviceable anti-friction bearing for the hinge end of a spring without materially changing the design of a conventional spring and without unduly weakening the vehicle frame.

It is a further object to provide a simple form of anti-friction spring bearing which will be cheap to manufacture, serviceable in use, and easy to assemble. Other minor objects will appear as the specification proceeds.

In the drawings, which show for illustrative purposes only, a preferred form of the invention:

Figure 1 is an end view of part of a vehicle frame and spring connected together by one form of our invention, parts being shown in section;

Figure 2 is a side view of parts shown in Figure 1, one-half of a dust cap being cut away to expose the interior.

In said drawings, 5 indicates a part of a vehicle frame, while 6' indicates an end of a conventional form of vehicle spring. The spring and frame are ordinarily hinged to each other and our invention affords an improved, simple anti-friction hinge for that purpose. In the form shown, the frame 5 is of channel formation, the legs of the channel being designated 6—7. The frame is provided with aligned apertures therethrough as indicated at 8—8. On the outside of the frame adjacent each aperture is a bearing member which, in the form shown, is a bearing cup 9 of hardened metal such as steel, having a rearwardly extending boss 10, fitting in the aperture 8 in the frame for positioning the same. No means has been disclosed for securing the cup and frame directly to each other, but it is, of course, to be understood that these two members may be held to each other if desired. The cup 9 preferably has a substantial bearing surface on the outside of the frame and the boss 10 fitting in the aperture 8 serves to position the cup on the frame and over the aperture.

A bearing pin 11 is secured in the spring eye 12 and the ends of the pin 11 project laterally beyond the edge thereof and through the aperture 8 and aperture 13 in the boss 10. On the outer end of each pin end is a bearing member or raceway 14 which, in the form shown, is in the form of a cone complementary to the bearing cup 9. The bearing ring 14 may be secured on the shaft in any suitable manner and we have shown the same as screw threaded onto the end of the pin and a lock nut or the like 15 may be employed for holding the race ring 14 in any desired position of adjustment.

16—16 indicate bearing members such as balls riding in the seats on the bearing members 9 and 14. It will be seen that the lines joining the points of contact of the balls on the bearing members converge outwardly so that the bearing is an angular thrust bearing which takes both radial and thrust loads.

In order to exclude dust and water from the bearing members and adjacent parts, we may employ a cover or cap 17 extending over the bearing parts and in the form shown this cap is threaded onto the bearing member 9.

It will be seen that the diameter of the circle enclosing the bearing members is larger than the diameter of the aperture in the frame. Such proportioning permits us to space the ring of balls radially outwardly at a sufficient distance to secure a well-proportioned bearing without, however, requiring an unduly large aperture in the frame, so that, while we secure a properly proportioned bearing, the frame 5 is not unduly weakened and in fact the aperture 8 need be only as large, or perhaps slightly larger, than the aperture ordinarily found in the frame in the ordinary pin hinge connection.

We have described and shown in detail the bearing at only one side of the frame, but it will be understood that the bearing at the opposite side may be, and preferably is, a duplicate of that just described. The weight of the vehicle will be supported from the spring through the anti-friction members.

While the invention has been described in some detail, we do not wish to be strictly limited to the form shown, since changes may be made within the scope of the invention, as defined in the appended claims.

We claim:

1. In a spring end connection, a frame having spaced apart side members with registering apertures therein, bearing member raceway means abutting the outside of said spaced apart side members, said bearing member raceway means having inwardly extending apertured bosses fitting within the apertures in said frame side members whereby said raceway means are sustained on said frame against axial and radial displacement, pin means extending through said bosses to the outside of said frame, said pin means having antifriction bearing member raceways at the ends thereof and complementary to the raceway portions of said first mentioned raceway means, and antifriction bearing members interposed between said complementary raceways.

2. In a spring end connection, a frame having spaced apart side members with registering apertures therein, bearing raceway means having bosses fitting in said apertures and having a part abutting said spaced apart frame members whereby said raceway means will be sustained against radial and axial displacement, said bosses having registering bores therein, pin means extending between said side members and through said bores in said bosses, raceways on the ends of said pin means complementary to said first mentioned raceway means, antifriction bearing members interposed between said complementary raceways, and cover members secured to said raceway means.

RAYMOND R. SEARLES.
ELISHA H. COOPER.